(12) United States Patent
Frick et al.

(10) Patent No.: US 8,859,695 B2
(45) Date of Patent: Oct. 14, 2014

(54) ACTIVATOR FOR EPOXY RESIN COMPOSITIONS

(71) Applicant: Sika Technology AG, Baar (CH)

(72) Inventors: Karsten Frick, Remetschwil (CH); Ulrich Gerber, Uitikon-Waldegg (CH); Juergen Finter, Zurich (CH); Andreas Kramer, Zurich (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/904,542

(22) Filed: May 29, 2013

(65) Prior Publication Data

US 2013/0253094 A1 Sep. 26, 2013

Related U.S. Application Data

(63) Continuation of application No. 12/988,917, filed as application No. PCT/EP2009/055252 on Apr. 3, 2009, now abandoned.

(30) Foreign Application Priority Data

Apr. 30, 2008 (EP) .................................. 08155487
Nov. 4, 2008 (CH) .................................. 1723/08

(51) Int. Cl.
*C08G 59/68* (2006.01)
*C08L 63/00* (2006.01)
*C08L 63/02* (2006.01)
*C08G 65/26* (2006.01)
*C08G 18/38* (2006.01)

(52) U.S. Cl.
CPC .......... *C08G 65/2672* (2013.01); *C08G 29/686* (2013.01); *C08G 18/3848* (2013.01)
USPC ........... 525/523; 525/65; 525/92 H; 525/454; 525/524; 525/526; 525/529; 525/531

(58) Field of Classification Search
None
See application file for complete search history.

(56) References Cited

U.S. PATENT DOCUMENTS

| | | | |
|---|---|---|---|
| 4,060,655 A | 11/1977 | Johannes et al. | |
| 4,200,725 A | 4/1980 | Gras et al. | |
| 4,242,248 A | 12/1980 | Gras et al. | |
| 4,246,394 A | 1/1981 | Schülde et al. | |
| 4,355,058 A * | 10/1982 | Gras et al. | 427/386 |
| 4,997,951 A | 3/1991 | Bagga | |
| 5,073,601 A | 12/1991 | Mülhaupt et al. | |
| 5,707,439 A | 1/1998 | Takekoshi et al. | |
| 5,719,240 A | 2/1998 | Gras et al. | |
| 6,197,849 B1 | 3/2001 | Zilg et al. | |
| 6,322,890 B1 | 11/2001 | Barron et al. | |
| 2008/0076886 A1 | 3/2008 | Burns et al. | |

FOREIGN PATENT DOCUMENTS

| | | |
|---|---|---|
| DE | 2 123 033 | 8/1972 |
| DE | 30 04 902 A1 | 8/1981 |
| EP | 0 000 418 A1 | 1/1979 |
| EP | 0 001 467 A1 | 4/1979 |
| EP | 0 308 664 | 3/1989 |
| EP | 0 338 985 A2 | 10/1989 |
| EP | 0 353 190 A2 | 1/1990 |
| EP | 0 501 074 A1 | 9/1992 |
| EP | 0 781 771 A1 | 7/1997 |
| EP | 0 818 486 A1 | 1/1998 |
| EP | 1 152 019 A1 | 11/2001 |
| EP | 1 728 825 A1 | 12/2006 |
| JP | A-60-011561 | 1/1985 |
| JP | 8-27402 A * | 1/1996 |
| JP | A-08-027402 | 1/1996 |
| JP | A-11-158253 | 6/1999 |
| JP | A-2000-226441 | 8/2000 |
| JP | A-2000-290257 | 10/2000 |
| JP | A-2005-290150 | 10/2005 |
| WO | WO 00/20483 A2 | 4/2000 |
| WO | WO 01/94492 A1 | 12/2001 |
| WO | WO 03/078163 A1 | 9/2003 |
| WO | WO 2004/055092 A1 | 7/2004 |
| WO | WO 2005/007720 A1 | 1/2005 |
| WO | WO 2005/007766 A1 | 1/2005 |
| WO | WO 2006/052726 A1 | 5/2006 |
| WO | WO 2006/052729 A1 | 5/2006 |
| WO | WO 2007/020266 A1 | 2/2007 |
| WO | WO 2007/025007 A1 | 3/2007 |
| WO | WO 2008/016889 A1 | 2/2008 |

OTHER PUBLICATIONS

Hermel-Davidock, T.J. et al., "Control of the Block Copolymer Morphology in Templated Epoxy Thermosets," *Journal of Polymer Science: Part B: Polymer Physics*, 2007, vol. 45, pp. 3338-3348.
International Search Report issued in International Application No. PCT/EP2009/055252 on Sep. 15, 2009 (with translation).
Nov. 18, 2010 International Preliminary Report on Patentability issued in Application No. PCT/EP2009/055252 (with translation).
Nov. 18, 2010 Written Opinion issued in Application No. PCT/EP2009/055252 (with translation).
Zhaoyang et al., "Recent Advances in Modified Epoxy Resin," *China Adhesives*, vol. 10, No. 2, pp. 41-44, Mar. 30, 2001 with English-language abstract.

(Continued)

*Primary Examiner* — Robert Sellers
(74) *Attorney, Agent, or Firm* — Oliff PLC

(57) ABSTRACT

A hem-curing epoxy resin composition, that includes an epoxy resin A having more than one epoxy group per molecule on average; a curing agent B for epoxy resins, which is activated at a temperature in a range of 100° C. to 220° C.; and an activator C for epoxy resin compositions, wherein activator C is a compound of formula (I), or is a reaction product between a compound of formula (Ia) and an isocyanate or an epoxide.

13 Claims, No Drawings

(56) References Cited

OTHER PUBLICATIONS

Mar. 5, 2013 Notification of the Second Office Action issued in Chinese Application No. 200980115323.2 with English-language translation.

Mar. 12, 2013 Notice of Reasons for Rejection issued in Japanese Application No. 2011-506718 with English-language translation.

HCAPLUS Accession No. 1981:54758 for Dupin et al., Annali dell 'Universita di Ferrara, Sezione 5: Chemica Pura ed Applicata, Supplemento, 1980, two pages.

HCAPLUS Accession No. 1981:103366 for Marxer, U.S. Patent No. 4,292,429, Sep. 29, 1981, four pages.

HCAPLUS Accession No. 2001:578925 for Wang et al., Zhongguo Fushi Yu Fanghu Xuebao, 2001, two pages.

* cited by examiner

ACTIVATOR FOR EPOXY RESIN COMPOSITIONS

This is a Continuation of application Ser. No. 12/988,917 filed Oct. 21, 2010, now abandoned, which in turn is a national stage application of International Application No. PCT/EP2009/055252 filed Apr. 30, 2009. The disclosure of the prior application[s] is hereby incorporated by reference herein in its entirety.

BACKGROUND

The present invention relates to the field of heat-curing epoxy resin bodyshell adhesives.

Heat-curing epoxy resin compositions have been known for a long time. An important application of heat-curing epoxy resin compositions is in vehicle assembly, in particular in bonding or in filling cavities in the bodyshell with foam material. In both cases, after application of the epoxy resin composition, the body is heated in a CDC (cathodic dip coating) oven, whereby the heat-curing epoxy resin composition is also cured and optionally expanded into a foam.

For fast curing, usually accelerators or activators are used in addition to heat-activated curing agents for epoxy resins. However, a disadvantage is that most activators or accelerators have a very negative effect on the mechanical properties of the cured epoxy resin. Besides ureas, certain imidazolines are also known in the prior art as activators or accelerators. Thus EP 0 501 074 A1 describes 1-isopropyl-2-phenylimidazoline and U.S. Pat. No. 4,246,394 discloses different imidazolines for use in heat-curing epoxy resin compositions. Finally, U.S. Pat. No. 4,997,951 describes imidazolines which can be synthesized from methyl salicylate. But these imidazolines have certain weaknesses, in particular with respect to activation behavior.

SUMMARY

The aim of the present invention is to provide novel activators for heat-curing epoxy resin compositions which are quite effective but nevertheless have good storage stability.

It has been surprisingly discovered that this aim can be achieved by means of activators according to embodiments.

The activators exhibit excellent activation or acceleration of epoxy resin curing, even at relatively low temperatures. However, in addition they also exhibit excellent storage stability, so they can be added to epoxy resins with no problems and can be stored for long periods at temperatures below 50° C. It has furthermore been shown that these activators have very little or no negative effect on the mechanical properties of the cured epoxy resin compositions.

Furthermore, heat-curing epoxy resin compositions can therefore be prepared according to embodiments.

Embodiments also relate to a method for bonding, as well as a bonded article.

DETAILED DESCRIPTION OF EMBODIMENTS

Embodiments may include an activator C for epoxy resin compositions. This activator C has formula (I) or is a reaction product between a compound of formula (Ia) and an isocyanate or epoxide.

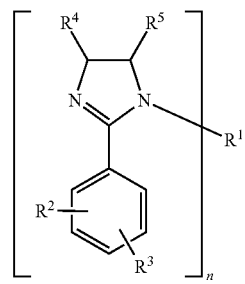

(I)

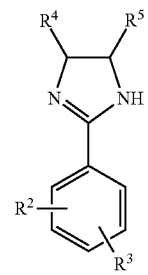

(Ia)

Here n stands for 1 or 2 or 3 or 4.

Furthermore $R^2$ and $R^3$ each independently stand for H or OH or halogen or $NH_2$ or $NHR^7$ or $N(R^7)_2$ or for an alkoxy, alkyl, aryl, alkylaryl, or arylalkyl group, in particular with 1 to 10 C atoms, or else $R^2$ and $R^3$ together form an optionally substituted aliphatic or aromatic ring.

$R^4$ and $R^5$ either each independently stand for H or OH or else $R^4$ and $R^5$ together form an optionally substituted aliphatic or aromatic ring. Preferably the alkoxy, alkyl, aryl, alkylaryl, or arylalkyl groups have between 1 and 10 C atoms, a $C_4$ to $C_6$ alkylene group is especially preferred.

$R^1$ furthermore stands either for an n-valent, optionally hetero atom-containing aliphatic, cycloaliphatic, or aromatic organic radical, or else $R^1$ stands for a radical of formula (II).

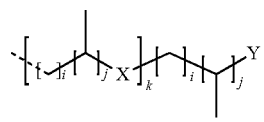

(II)

Here i and j and k each stand for a number from 0 to 10, provided that the sum of i and j is at least 2 and X stands for O or S or $NR^7$. Y stands for $OR^7$ or $SR^7$ or $N(R^7)(R^{7'})$ or for a substituent of formula (III).

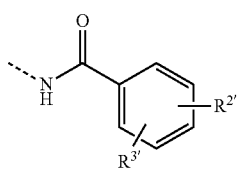

(III)

$R^{2'}$ and $R^{3'}$ again each independently stand either for H or OH or halogen or $NH_2$ or $NHR^7$ or $N(R^7)_2$ or for an alkoxy, alkyl, aryl, alkylaryl, or arylalkyl group, or else $R^{2'}$ together with $R^{3'}$ form an optionally substituted aliphatic or aromatic ring.

Finally, $R^7$ and $R^{7'}$ each independently stand for H or for an alkyl, cycloalkyl, aralkyl, or aryl group with 1 to 8 carbon atoms.

The dashed lines in the formulas in this document in each case represent bonding between the respective substituents and the corresponding molecular moiety.

Furthermore, at least one of the radicals $R^2$, $R^3$, $R^4$, and $R^5$ must be different from H and, if the radicals $R^{2'}$ and/or $R^{3'}$ are present, at least three of the radicals $R^2$, $R^{2'}$, $R^3$, and $R^{3'}$ must be different from H.

$R^1$ preferably stands for a radical of formula (II).

In this document, the use of the term "each independently" in connection with substituents, radicals, or groups means that substituents, radicals, or groups having the same designation can appear at the same time in the same molecule with different meanings.

It should be noted that an essential feature of the invention is that at least one of the radicals $R^2$, $R^3$, $R^4$, and $R^5$ is different from H. Thus in particular 1-methyl-2-phenylimidazoline, 1-isopropyl-2-phenylimidazoline, or 2-phenylimidazoline do not correspond to formula (I) and thus do not represent activators according to the invention.

The activator C in particular has formula (I-1) or (I-2).

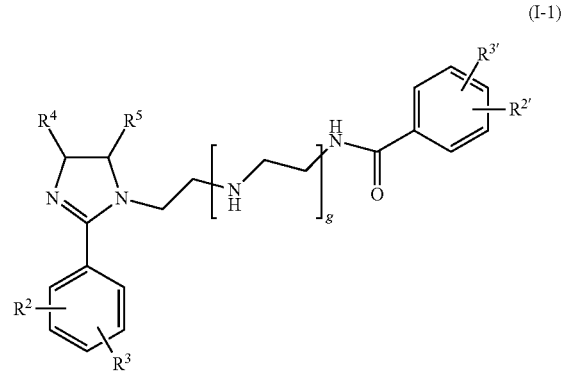

(I-1)

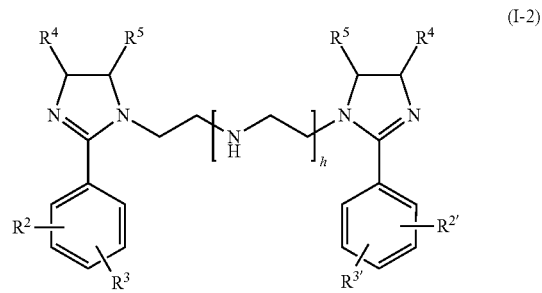

(I-2)

Here g stands for 0 or 1 or 2 or 3 and h stands for 0 or 1 or 2.

The radicals $R^2$ and $R^{2'}$ stand in particular for OH, and $R^3$ and/or $R^{3'}$ stand in particular for OH, Cl, $CH_3$, or $OCH_3$. Preferably $R^2$ and $R^{2'}$ each stand for OH, and $R^3$ and $R^{3'}$ each stand for Cl. Furthermore, preferably $R^2$ and $R^{2'}$ each stand for OH, and $R^3$ and $R^{3'}$ each stand for $CH_3$. $R^2$ and $R^3$, or $R^2$ and $R^3$, are preferably meta to each other.

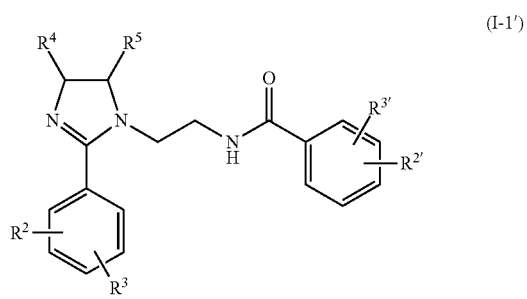

(I-1')

If the radicals $R^{2'}$ and/or $R^{3'}$ are present in the formula of the activator C, as is the case in formulas (I-1), (I-1'), and (I-2), it should be noted that it is firstly an essential feature of the invention that at least one of the radicals $R^2$, $R^3$, $R^4$, and $R^5$ is different from H, and secondly that at least three of the radicals $R^2$, $R^{2'}$, $R^3$, and $R^{3'}$ are different from H.

Thus in particular compounds having the two following formulas do not correspond to formula (I), and therefore do not represent activators according to the invention:

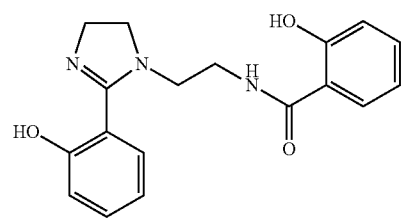

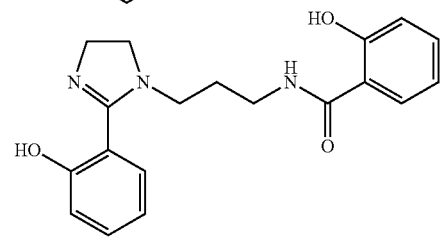

Most activators C of formula (I) can be synthesized from an acid methyl ester of formula (I-1a) and an amine.

Thus the activators C of formula (I-1) can be synthesized from the acid methyl ester of formula (I-1a) and/or (I-1a') and a polyamine of formula (I-1b). Preferably $R^2$ and/or $R^{2'}$ are ortho to the ester group.

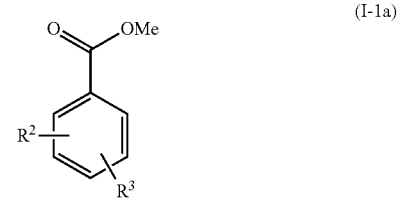

(I-1a)

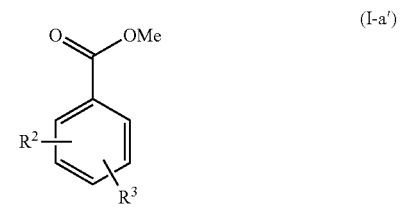

(I-a')

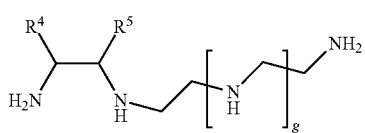
(I-1b)

The activators C of formula (I-2) can be synthesized from the acid methyl ester of formula (I-1a) and a polyamine of formula (I-2b). Here an intermediate of formula (I-2c) is formed, which can be converted to the activator of formula (I-2) by ring closure or condensation.

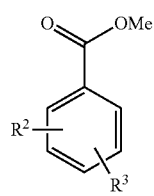
(I-1a)

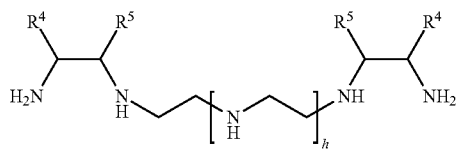
(I-2b)

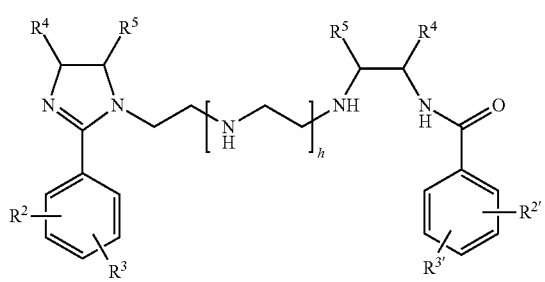
(I-2c)

These reactions are typically carried out with a mole ratio of (I-1a):(I-1b) or (I-2b) of at least 2:1, in particular 3:1 to 4:1. If the reaction is carried out with such a mole ratio less than 2:1, compounds of formula (I-3a) or (I-3b) are formed.

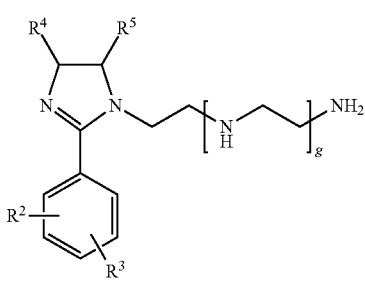
(I-3a)

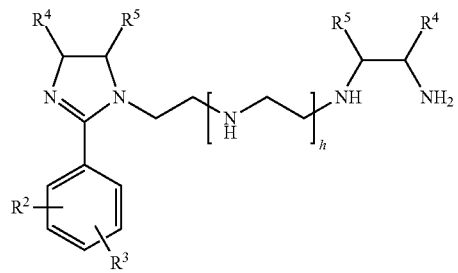
(I-3b)

Using an acid methyl ester of formula such compounds of formula (I-3a) or (I-3b) can be converted to activators in which $R^2$, $R^{2'}$ and/or $R^3$, $R^{3'}$.

If an acid methyl ester of formula (I-1a) is reacted with an amine of formula (I-4-a), then an activator of formula C (I-4) is formed.

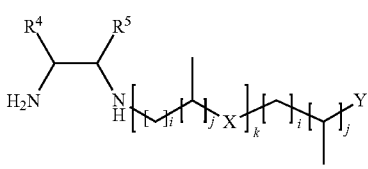
(I-4a)

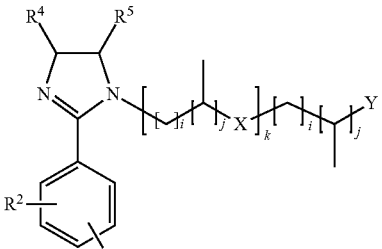
(I-4)

If an acid methyl ester of formula (I-1a) is reacted with an amine of formula (I-5a), corresponding to an amine of formula (I-2b) with h=0, then depending on the stoichiometry between the acid methyl ester and the amine of formula (I-5a), an activator C of formula (I-5) or (I-5') or (I-5") is formed.

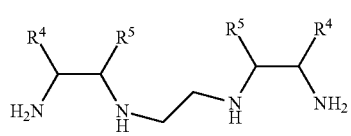
(I-5a)

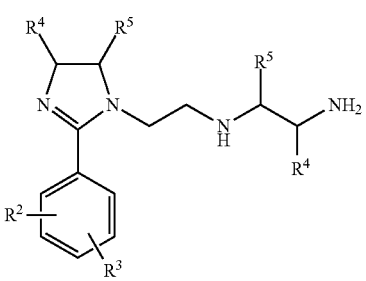
(I-5)

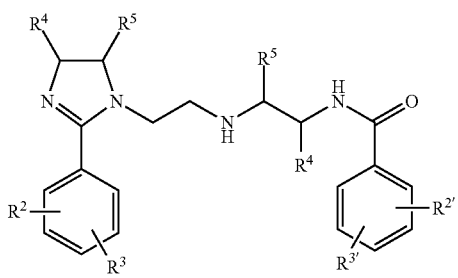

(I-5')

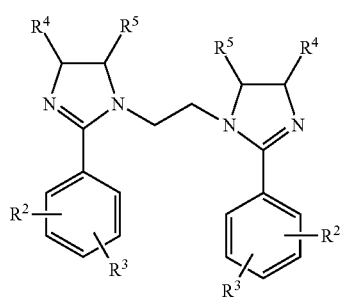

(I-5")

Furthermore, the activator C can be a reaction product between a compound of formula (Ia) and an isocyanate, in particular a monoisocyanate or diisocyanate. Here the activator C in particular has at least one structural element of formula (Ia-1).

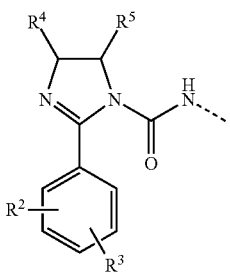

(Ia-1)

Suitable isocyanates are in particular monoisocyanates or diisocyanates. Especially suitable monoisocyanates are phenyl isocyanate, tolyl isocyanate, or toluoylsulfonyl monoisocyanate.

Suitable diisocyanates are aliphatic, cycloaliphatic, aromatic, or aralphatic diisocyanates, in particular methylene diphenyl diisocyanate (MDI), hexamethylene diisocyanate (HDI), toluene diisocyanate (TDI), tolidine diisocyanate (TODI), isophorone diisocyanate (IPDI), trimethyl hexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate ($H_{12}$MDI), p-phenylene diisocyanate (PPDI), m-tetramethylxylylene diisocyanate (TMXDI), as well as dimers or trimers thereof.

HDI, IPDI, MDI, or TDI are preferred diisocyanates.

A preferred monoisocyanate or diisocyanate is selected from the group consisting of phenyl isocyanate, tolyl isocyanate, hexamethylene diisocyanate (HDI), isophorone diisocyanate (IPDI), methylene diphenyl diisocyanate (MDI), and toluene diisocyanate (TDI).

The reaction of a compound of formula (Ia) with an isocyanate is carried out by a method familiar to the person skilled in the art of polyurethanes.

Furthermore, the activator C can be a reaction product between a compound of formula (Ia) and an epoxide, in particular a monoglycidyl ether or diglycidyl ether or triglycidyl ether. Here the activator C in particular has at least one structural element of formula (Ia-2), in particular of formula (Ia-2').

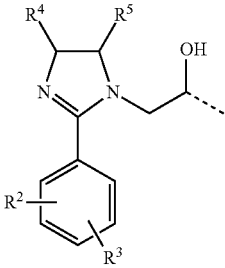

(Ia-2)

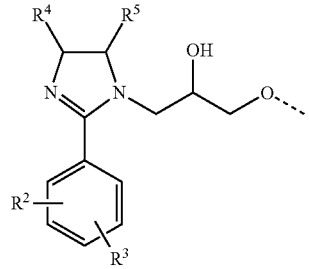

(Ia-2')

Suitable epoxides are in particular

Glycidyl ethers of monofunctional saturated or unsaturated, branched or unbranched, cyclic or open-chain $C_4$-$C_{30}$ alcohols, in particular selected from the group consisting of butyl glycidyl ether, hexyl glycidyl ether, 2-ethylhexyl glycidyl ether, allyl glycidyl ether, tetrahydrofurfuryl and furfuryl glycidyl ether, trimethoxysilylpropyl glycidyl ether (3-glycidyloxypropyltrimethoxysilane);

Glycidyl ethers of difunctional saturated or unsaturated, branched or unbranched, cyclic or open-chain $C_2$-$C_{30}$ alcohols, in particular selected from the group consisting of ethylene glycol glycidyl ether, butanediol glycidyl ether, hexanediol glycidyl ether, octanediol glycidyl ether, cyclohexane dimethanol diglycidyl ether, and neopentyl glycol diglycidyl ether;

Glycidyl ethers of trifunctional or polyfunctional, saturated or unsaturated, branched or unbranched, cyclic or open-chain alcohols such as epoxidized castor oil, epoxidized trimethylolpropane, epoxidized pentaerythrol, or polyglycidyl ethers of aliphatic polyols such as sorbitol, glycerol, or trimethylolpropane;

Glycidyl ethers of phenol compounds and aniline compounds, in particular selected from the group consisting of phenyl glycidyl ether, cresyl glycidyl ether, p-tert-butyl phenyl glycidyl ether, nonylphenyl glycidyl ether, 3-n-pentadecenyl glycidyl ether (from cashew nutshell oil), N,N-diglycidyl aniline, and p-aminophenyl triglycidyl [ether];

Epoxidized amines such as N,N-diglycidyl cyclohexylamine;

Epoxidized monocarboxylic acids or dicarboxylic acids, in particular selected from the group consisting of neodecanoic acid glycidyl ester, methacrylic acid glycidyl ester, benzoic acid glycidyl ester, phthalic acid diglycidyl ester, tetra- and hexahydrophthalic acid diglycidyl ester, and diglycidyl esters of dimeric fatty acids, as well as terephthalic acid glycidyl ester and trimellitic acid glycidyl ester;

Epoxidized difunctional or trifunctional, low molecular weight or high molecular weight polyether polyols, in particular polyethylene glycol diglycidyl ether or polypropylene glycol diglycidyl ether.

Epoxy resins, such as are described as epoxy resin A as a component of heat-curing epoxy resin compositions, in particular diglycidyl ethers of bisphenol A and/or F.

Hexanediol diglycidyl ether, cresyl glycidyl ether, p-tert-butylphenyl glycidyl ether, polypropylene glycol diglycidyl ether, and polyethylene glycol diglycidyl ether are especially preferred.

The reaction of a compound of formula (Ia) with an epoxide is carried out by a method familiar to the person skilled in the art of epoxy compounds.

If in the case of polyepoxides, i.e., in particular diglycidyl ethers or triglycidyl ethers, formula (Ia) is used in substoichiometric amounts, an activator C is formed which has at least one free epoxy group. In this way, the activator C in the heat-curing epoxy resin compositions described below can realize its activation function but ultimately is chemically bound to the epoxy resin matrix, whereby activator C is prevented from leaching out of the cured compound over time (in particular due to the influence of environmental factors such as heat, contamination by water or chemicals) and thus being released into the environment in contact with the cured composition.

In fact, in principle the activator C should not have any primary or secondary amino groups. But if it nevertheless has such groups, this is not at all critical since, although when used in a heat-curing epoxy resin composition described below it does react with the epoxy resin, in this reaction just an optionally higher molecular weight reaction product is formed which likewise functions as an activator. It is also assumed that in this case, because of the epoxy to activator concentration ratio, a reaction product forms which, besides having the activating imidazoline structure, also has free epoxy groups, whereby such an activator is also chemically bound to the epoxy resin matrix, resulting in the advantages mentioned above.

It has suprisingly been shown that the activators C result in very effective activation of curing of epoxy resins by heat. The improved activation results in curing at lower temperature. In DSC, this is apparent in a shift of the reaction peak, or by a shift of the "onset point" to lower temperatures for the first heating of an epoxy resin mixture containing an activator C, compared with the corresponding composition without activator C.

Thus curing can be achieved even at temperatures starting from 150° C., sometimes even starting from 140° C., as is needed in the "low-bake" curing process.

Although curing occurs at lower temperatures, there is little or no negative impact on the glass transition temperature (Tg) of the cured epoxy resin composition.

At the same time, however, this increased activity does not lead to a negative impact on the storage stability of the epoxy resin composition. Thus during storage at temperatures of up to 40° C., no significant increase in viscosity or even gel formation of the composition occurs even over long storage times of typically more than half a year.

In a further aspect, embodiments may relate to a heat-curing epoxy resin composition consisting of
a) at least one epoxy resin A with more than one epoxy group per molecule on the average;
b) at least one curing agent B for epoxy resins which is activated by elevated temperature, and;
c) at least one activator C as described in detail above.

The epoxy resin with more than one epoxy group per molecule on the average is preferably a liquid epoxy resin or a solid epoxy resin. The term "solid epoxy resin" is very familiar to the person skilled in the art of epoxides, and is used in contrast to "liquid epoxy resins." The glass transition temperature of solid resins is above room temperature, i.e., at room temperature they can be broken up into free-flowing particles.

Preferred solid epoxy resins have formula (X):

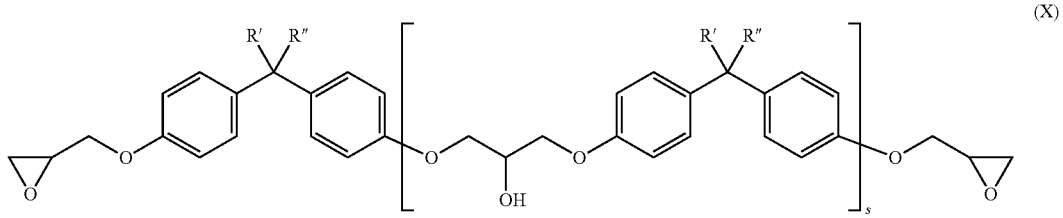

(X)

Here the substituents R' and R" each independently stand for either H or $CH_3$. Furthermore, the subscript s stands for a number>1.5, in particular a number from 2 to 12.

Such solid epoxy resins are commercially available, for example, from Dow or Huntsman or Hexion.

Compounds of formula (X) with a subscript s between 1 and 1.5 are called semisolid epoxy resins by the person skilled in the art. For the present invention here, they are also considered as solid resins. However, epoxy resins in the narrower sense are preferred, i.e., for which the subscript s has a value>1.5.

Preferred liquid epoxy resins have formula (XI):

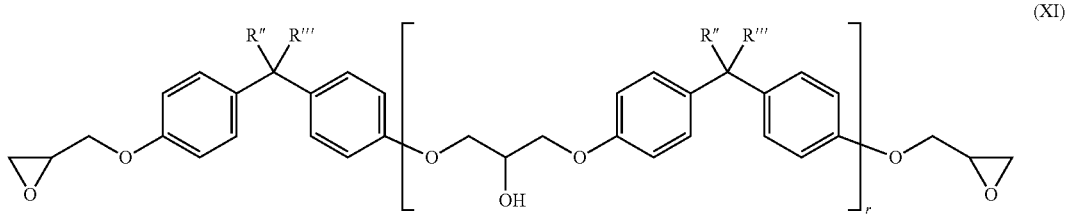

(XI)

Here the substituents R" and R'" each independently stand for either H or CH$_3$. Furthermore, the subscript r stands for a number from 0 to 1. The subscript r preferably stands for a number less than 0.2.

These compounds are therefore preferably diglycidyl ethers of bisphenol A (DGEBA), bisphenol F, and bisphenol A/F (the designation "A/F" here refers to a mixture of acetone and formaldehyde used as the starting material in its manufacture). Such liquid resins are available, for example, as ARALDITE® GY 250, ARALDITE® PY 304, ARALDITE® GY 282 (Huntsman), or D.E.R.® 331, or D.E.R.® 330 (Dow), or Epikote 828 (flexion).

Furthermore, "novolacs" are suitable as epoxy resin A. These have in particular the following formula:

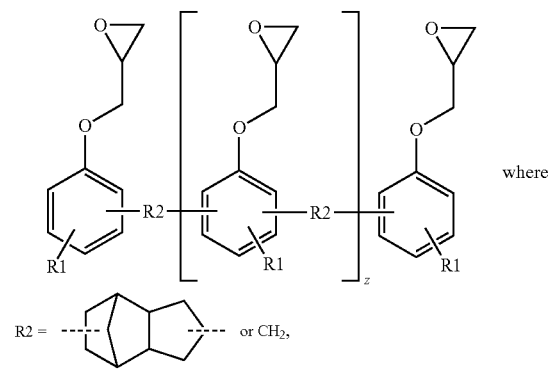

where

R1 = H or methyl and z = 0-7.

Here these can be in particular phenol or cresol novolacs (R2=CH$_2$).

Such epoxy resins are commercially available under the trade names EPN or ECN as well as TACTIX® from Huntsman or as the D.E.N.® product line from Dow Chemical.

Epoxy resin A preferably is a liquid epoxy resin of formula (XI). In another even more preferred embodiment, the heat-curing epoxy resin composition contains at least one liquid epoxy resin of formula (XI) as well as at least one solid epoxy resin of formula (X).

The proportion of epoxy resin A is preferably 10-85 wt. %, in particular 15-70 wt. %, preferably 15-60 wt. %, based on the weight of the composition.

The composition according to the invention additionally contains at least one curing agent B for epoxy resins which is activated at elevated temperature. Here the curing agent is preferably selected from the group consisting of dicyanodiamide, guanamines, guanidines, aminoguanidines, and derivatives thereof. Catalytically effective curing agents can also be used, such as substituted ureas such as, for example, 3-(3-chloro-4-methylphenyl)-1,1-dimethylurea (chlortoluron) or phenyl dimethylureas, in particular p-chlorophenyl-N,N-dimethylurea (monuron), 3-phenyl-1,1-dimethylurea (fenuron), 3,4-dichlorophenyl-N,N-dimethylurea (diuron), or N,N-dimethylurea. Compounds in the class of imidazoles and amine complexes can also be used.

Curing agent B is preferably a curing agent selected from the group consisting of dicyanodiamide, guanamines, guanidines, aminoguanidines, and derivatives thereof; substituted ureas, in particular 3-(3-chloro-4-methylphenyl)-1,1-dimethylurea (chlortoluron) or phenyl dimethylureas, in particular p-chlorophenyl-N,N-dimethylurea (monuron), 3-phenyl-1,1-dimethylurea (fenuron), 3,4-dichlorophenyl-N,N-dimethylurea (diuron), N,N-dimethylurea, as well as imidazoles, imidazole salts, and amine complexes.

Dicyanodiamide is particularly preferred as curing agent B.

The total proportion of curing agent B is advantageously 1-10 wt. %, preferably 2-8 wt. %, based on the weight of the total composition.

In addition, the heat-curing epoxy resin composition can contain a thixotropic agent C [sic] based on a urea derivative. The urea derivative is in particular a reaction product between an aromatic monomeric diisocyanate and an aliphatic amine compound. It is also quite possible to react more than one different monomeric diisocyanates with one or more aliphatic amine compounds, or to react a monomeric diisocyanate with more than one aliphatic amine compounds. The reaction product between 4,4'-diphenylmethylene diisocyanate (MDI) and butylamine has proven to be particularly advantageous.

The urea derivative is preferably present in a carrier. The carrier can be a plasticizer, in particular a phthalate or an adipate, preferably a diisodecylphthalate (DIDP) or dioctyladipate (DOA). The carrier can also be a non-diffusing carrier. This is preferred in order to ensure the least possible migration of the unreacted components after curing.

Blocked polyurethane prepolymers are preferred as the non-diffusing carrier.

Preparation of such preferred urea derivatives and carriers is described in detail in the patent application EP 1 152 019 A1. The carrier is advantageously a blocked polyurethane prepolymer, in particular obtained by reaction of a trifunctional polyether polyol with IPDI, followed by blocking of the terminal isocyanate groups by ε-caprolactam.

The total proportion of thixotropic agent C is advantageously 0-40 wt. %, preferably 5-25 wt. %, based on the weight of the total composition. The ratio of the weight of the urea derivative to the weight of the optionally present carrier is preferably 2:98 to 50:50, in particular 5:95-25:75.

It has furthermore been shown that it is especially advantageous if the heat-curing one-component epoxy resin composition additionally contains at least one other toughener D. The additional toughener D can be solid or liquid.

The toughener D is in particular selected from the group consisting of blocked polyurethane polymers, liquid rubbers, epoxy resin-modified liquid rubbers, and core/shell polymers.

In embodiments, this toughener D may be a liquid rubber D1 which is an acrylonitrile/butadiene copolymer terminated by carboxyl groups or (meth)acrylate groups or epoxy groups, or is a derivative thereof. Such liquid rubbers are commercially available, for example, under the name HYPRO® (formerly HYCAR®) CTBN and CTBNX and ETBN from Nanoresins AG, Germany or Emerald Performance Materials LLC. Suitable derivatives are in particular elastomer-modified prepolymers having epoxy groups, such as are commercially marketed as the POLYDIS® product line, preferably from the POLYDIS® 36xx product line, by the Struktol Company (Schill & Seilacher Group, Germany) or as the Albipox product line (Nanoresins, Germany).

In embodiments, the toughener D may be a polyacrylate liquid rubber D2 that is completely miscible with liquid epoxy resins, and only separates into microdroplets during curing of the epoxy resin matrix. Such polyacrylate liquid rubbers are available, for example, under the name 20208-XPA from Rohm and Haas.

It is clear to the person skilled in the art that mixtures of liquid rubbers can of course also be used, in particular mixtures of carboxyl-terminated or epoxy-terminated acrylonitrile/butadiene copolymers or derivatives thereof with epoxy-terminated polyurethane prepolymers.

In embodiments, the toughener D may be a solid toughener which is an organic ion-exchanged layered mineral DE1.

The ion-exchanged layered mineral DE1 can be either a cation-exchanged layered mineral DE1c or an anion-exchanged layered mineral DE1a.

The cation-exchanged layered mineral DE1c here is obtained from a layered mineral DE1', in which at least some of the cations have been exchanged by organic cations. Examples of such cation-exchanged layered minerals DE1c are in particular those which are mentioned in U.S. Pat. No. 5,707,439 or in U.S. Pat. No. 6,197,849. The method for preparation of these cation-exchanged layered minerals DE1c is also described in those patents. The layered mineral DE1' is preferably a sheet silicate. The layered mineral DE1' is particularly preferably a phyllosilicate as described in U.S. Pat. No. 6,197,849 Column 2, Line 38 to Column 3, Line 5, in particular a bentonite. Layered minerals DE1' such as kaolinite or a montmorillonite or a hectorite or an illite have been shown to be especially suitable.

At least some of the cations of the layered mineral DE1' are replaced by organic cations. Examples of such cations are n-octylammonium, trimethyldodecylammonium, dimethyldodecylammonium, or bis(hydroxyethyl)octadecylammonium or similar derivatives of amines that can be obtained from natural fats and oils; or guanidinium cations or amidinium cations; or cations of N-substituted derivatives of pyrrolidine, piperidine, piperazine, morpholine, thiomorpholine; or cations of 1,4-diazobicyclo[2.2.2]octane (DABCO) and 1-azobicyclo[2.2.2]octane; or cations of N-substituted derivatives of pyridine, pyrrole, imidazole, oxazole, pyrimidine, quinoline, isoquinoline, pyrazine, indole, benzimidazole, benzoxazole, thiazole, phenazine, and 2,2'-bipyridine. Furthermore, cyclic amidinium cations are suitable, in particular those such as are disclosed in U.S. Pat. No. 6,197,849 in Column 3, Line 6 to Column 4, Line 67. Compared with linear ammonium compounds, cyclic ammonium compounds are distinguished by elevated thermal stability, since thermal Hofmann degradation cannot occur with them.

Preferred cation-exchanged layered minerals DE1c are familiar to the person skilled in the art under the term organoclay or nanoclay, and are commercially available, for example, under the group names TIXOGEL® or NANOFIL® (Südchemie), CLOISITE® (Southern Clay Products), or NANOMER® (Nanocor, Inc.), or GARAMITE® (Rockwood).

The anion-exchanged layered mineral DE1a here is obtained from a layered mineral DE1" in which at least some of the anions have been exchanged by organic anions. An example of such an anion-exchanged layered mineral DE1a is a hydrotalcite DE1", in which at least some of the interlayer carbonate anions have been exchanged by organic anions.

It is also quite possible for the composition to simultaneously contain a cation-exchanged layered mineral DE1c and an anion-exchanged layered mineral DE1a.

In a further embodiment, the toughener D is a solid toughener which is a block copolymer DE2. The block copolymer DE2 is obtained from an anionic or controlled free-radical polymerization of methacrylic acid ester with at least one other monomer having an olefinic double bond. Particularly preferred as a monomer having an olefinic double bond is one in which the double bond is conjugated directly with a hetero atom or with at least one other double bond. Particularly suitable monomers are selected from the group including styrene, butadiene, acrylonitrile, and vinyl acetate. Acrylate/styrene/acrylonitrile (ASA) copolymers, available, for example, under the name GELOY 1020 from GE Plastics, are preferred.

Especially preferred block copolymers DE2 are block copolymers derived from methacrylic acid methyl ester, styrene, and butadiene. Such block copolymers are available, for example, as triblock copolymers under the group name SBM from Arkema.

In embodiments, the toughener D may be a core/shell polymer DE3. Core/shell polymers consist of an elastic core polymer and a rigid shell polymer. Particularly suitable core/shell polymers consist of a core made from elastic acrylate or butadiene polymer which is enclosed in a rigid shell made from a rigid thermoplastic polymer. This core/shell structure is either formed spontaneously through separation of a block copolymer or is determined by latex polymerization or suspension polymerization followed by grafting. Preferred core/shell polymers are "MBS polymers," which are available under the trade names CLEARSTRENGTH® from Atofina, PARALOID® from Rohm and Haas, or F-351® from Zeon.

Especially preferred are core/shell polymer particles that are already in the form of dried polymer latex. Examples of these are GENIOPERL® M23A from Wacker with a polysiloxane core and an acrylate shell, radiation crosslinked rubber particles of the NEP series manufactured by Eliokem, or Nanoprene from Lanxess or Paraloid EXL from Rohm and Haas or Kane ACE MX-120 from Kaneka.

Other comparable examples of core/shell polymers are sold under the name ALBIDUR® by Nanoresins AG, Germany.

Nanoscale silicates in an epoxy matrix are also suitable, such as are sold under the trade name Nonopox from Nanoresins AG, Germany.

In embodiments, the toughener D may be a reaction product DE4 between carboxylated solid nitrile rubber and excess epoxy resin.

In embodiments, the toughener D may be a blocked polyurethane polymer of formula (IV).

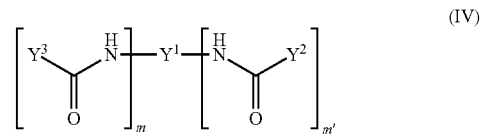

Here m and m' each stand for numbers between 0 and 8, provided that m+m' stands for a number from 1 to 8.

Furthermore, $Y^1$ stands for a linear or branched polyurethane polymer PU1 terminated by m+m' isocyanate groups, after removal of all terminal isocyanate groups.

$Y^2$ each independently stand for a blocking group which is cleaved at a temperature above 100° C.

$Y^3$ each independently stand for a group of formula (IV').

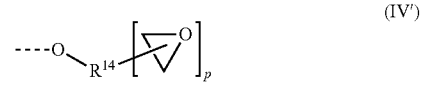

Here $R^{14}$ stands for an aliphatic, cycloaliphatic, aromatic, or aralphatic epoxy radical containing a primary or secondary hydroxyl group, after removal of the hydroxide and epoxide groups, and p stands for the numbers 1, 2, or 3.

In this document, "araliphatic radical" means an aralkyl group, i.e., an alkyl group substituted by aryl groups (see Römpp, CD Römpp Chemie Lexikon [Römpp Chemistry Encyclopedia], Version 1, Stuttgart/New York, Georg Thieme Verlag, 1995).

$Y^2$ each independently stand in particular for substituents selected from the group consisting of

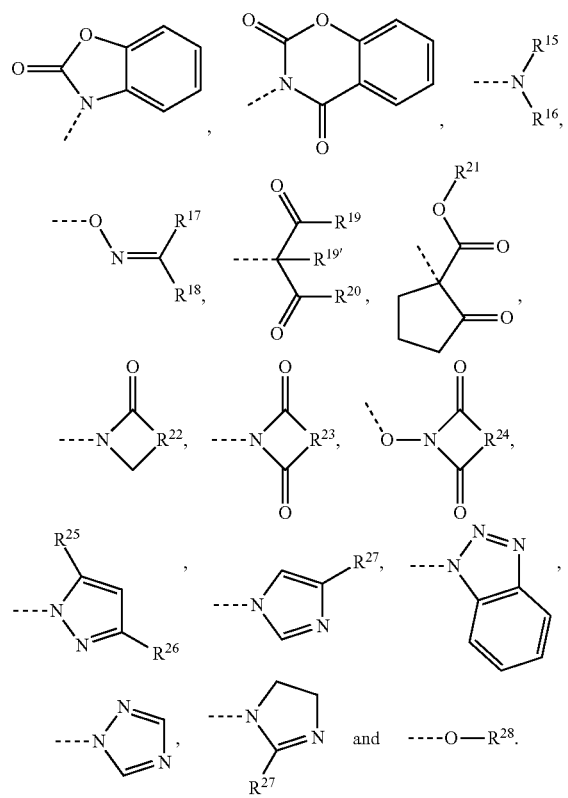

Here $R^{15}$, $R^{16}$, $R^{17}$, and $R^{18}$ each independently stand for an alkyl or cycloalkyl or aralkyl or arylalkyl group, or else $R^{15}$ together with $R^{16}$ or $R^{17}$ together with $R^{18}$ forms part of a 4- to 7-membered ring, which is optionally substituted.

Furthermore, $R^{19}$, $R^{19'}$ and $R^{20}$ each independently stand for an alkyl or aralkyl or arylalkyl group or for an alkyloxy or aryloxy or aralkyloxy group, and $R^{11}$ stands for an alkyl group.

$R^{23}$ and $R^{24}$ each independently stand for an alkylene group with 2 to 5 C atoms, which optionally has double bonds or is substituted, or for a phenylene group or for a hydrogenated phenylene group, and $R^{25}$, $R^{26}$, and $R^{27}$ each independently stand for H or for an alkyl group or for an aryl group or an aralkyl group.

Finally, $R^{28}$ stands for an aralkyl group or for a mononuclear or polynuclear substituted or unsubstituted aromatic group, which optionally has aromatic hydroxyl groups.

Phenols or bisphenols, after removal of an hydroxyl group, are in particular firstly to be considered as R. Preferred examples of such phenols and bisphenols are in particular phenol, cresol, resorcinol, pyrocatechol, cardanol (3-pentadecenylphenol (from cashew nutshell oil)), nonylphenol, phenols reacted with styrene or dicyclopentadiene, bisphenol A, bisphenol F, and 2,2'-diallyl bisphenol A.

Hydroxybenzyl alcohol and benzyl alcohol, after removal of an hydroxyl group, are in particular secondly to be considered as $R^{28}$.

If $R^{15}$, $R^{16}$, $R^{17}$, $R^{18}$, $R^{19}$, $R^{19'}$, $R^{20}$, $R^{21}$, $R^{25}$, $R^{26}$, or $R^{27}$ stand for an alkyl group, the latter group is in particular a linear or branched $C_1$-$C_{20}$ alkyl group.

If $R^{15}$, $R^{16}$, $R^{17}$, $R^{18}$, $R^{19}$, $R^{19'}$, $R^{20}$, $R^{25}$, $R^{26}$, $R^{27}$, or $R^{28}$ stand for an aralkyl group, the latter group is in particular an aromatic group bonded through methylene, in particular a benzyl group.

If $R^{15}$, $R^{16}$, $R^{17}$, $R^{18}$, $R^{19}$, $R^{19'}$, or $R^{20}$ stand for an alkylaryl group, the latter is in particular a $C_1$ to $C_{20}$ alkylaryl group bonded through phenylene such as, for example, tolyl or xylyl.

Especially preferred radicals $Y^2$ are radicals selected from the group consisting of

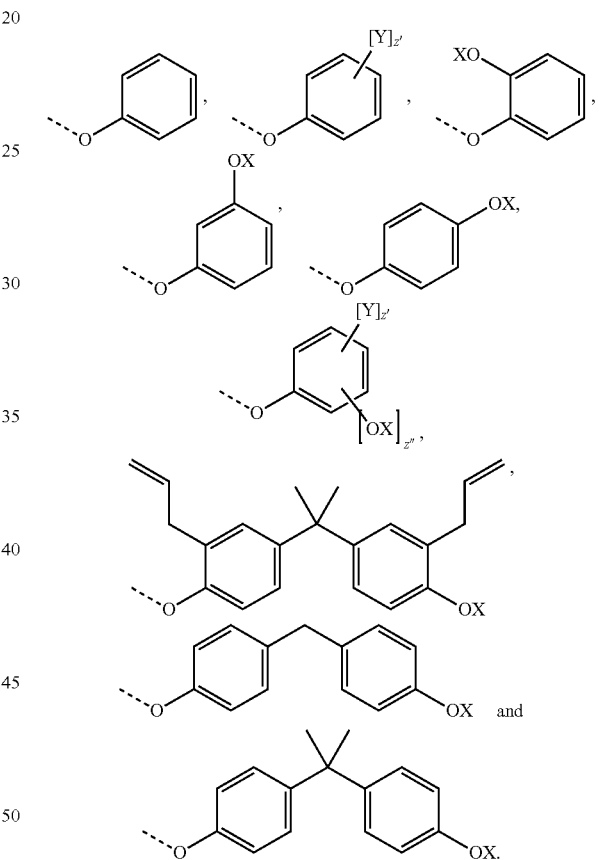

The radical Y here stands for a saturated or olefinic unsaturated hydrocarbon radical with 1 to 20 C atoms, in particular with 1 to 15 C atoms. Allyl, methyl, nonyl, dodecyl or an unsaturated $C_{1-5}$ alkyl radical with 1 to 3 double bonds are particularly preferred.

The radical X stands for H or for an alkyl, aryl, aralkyl group, in particular for H or methyl.

The subscripts z' and z" stand for the numbers 0, 1, 2, 3, 4, or 5, provided that the sum z'+z" stands for a number between 1 and 5.

Preferably m is different from 0.

The blocked polyurethane polymer of formula (IV) is synthesized from isocyanate group-terminated linear or branched polyurethane polymers PU1 and one or more isocyanate-reactive compounds $Y^2H$ and/or $Y^3H$. If more than one such isocyanate-reactive compound is used, the reaction can be carried out sequentially or with a mixture of these compounds.

The reaction is carried out in such a way that the one or more isocyanate-reactive compounds $Y^2H$ and/or $Y^3H$ are used in stoichiometric amounts or in stoichiometric excess, in order to ensure that all the NCO groups are reacted.

The isocyanate-reactive compound $Y^3H$ is a monohydroxyl epoxy compound of formula (IVa).

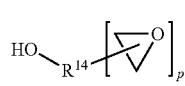
(IVa)

If more than one such monohydroxyl epoxy compound is used, the reaction can be carried out sequentially or with a mixture of these compounds.

The monohydroxyl epoxy compound of formula (IVa) has 1, 2, or 3 epoxy groups. The hydroxyl group of this monohydroxyl epoxy compound (IVa) can be a primary or a secondary hydroxyl group.

Such monohydroxyl epoxy compounds can, for example, be produced by reaction of polyols with epichlorohydrin. Depending on how the reaction is carried out, when polyfunctional alcohols are reacted with epichlorohydrin, the corresponding monohydroxyl epoxy compounds are also formed as byproducts in different concentrations. The latter can be isolated by means of conventional separation operations. Generally, however, it is sufficient to use the product mixture obtained in the polyol glycidylization reaction, consisting of the polyol reacted completely and partially to form the glycidyl ether. Examples of such hydroxyl-containing epoxides are butanediol monoglycidyl ethers (present in butanediol diglycidyl ethers), hexanediol monoglycidyl ethers (present in hexanediol diglycidyl ethers), cyclohexanedimethanol glycidyl ethers, trimethylolpropane diglycidyl ethers (present as a mixture in trimethylolpropane triglycidyl ethers), glycerol diglycidyl ethers (present as a mixture in glycerol triglycidyl ethers), pentaerythritol triglycidyl ethers (present as a mixture in pentaerythritol tetraglycidyl ethers). It is preferable to use trimethylolpropane diglyeidyl ether, which occurs in a relatively high proportion in conventionally synthesized trimethylolpropane triglycidyl ether.

However, other similar hydroxyl-containing epoxides can also be used, in particular glycidol, 3-glycidyloxybenzyl alcohol, or hydroxymethyl cyclohexene oxide. Also preferred is the β-hydroxy ether of formula (IVb), which is present in a proportion up to 15% in commercially available liquid epoxy resins synthesized from bisphenol A (R=$CH_3$) and epichlorohydrin, as well as the corresponding β-hydroxy ethers of formula (IVb), which are formed when bisphenol F (R=H) or the mixture of bisphenol A and bisphenol F is reacted with epichlorohydrin.

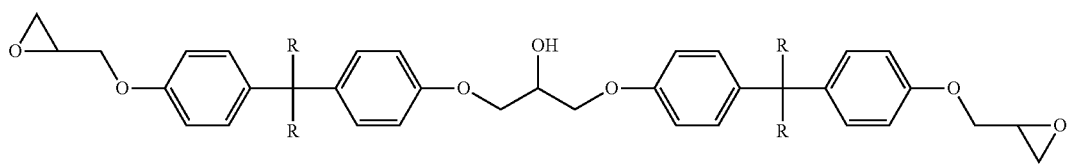
(IVb)

Also preferred are distillation residues produced during manufacture of high-purity distilled liquid epoxy resins. Such distillation residues have an hydroxyl-containing epoxide concentration one to three times higher than in commercially available undistilled liquid epoxy resins. Furthermore, very different epoxides with a β-hydroxy ether group, synthesized by reaction of (poly)epoxides with a substoichiometric amount of monofunctional nucleophiles such as carboxylic acids, phenols, thiols, or secondary amines, can also be used.

A trivalent radical of the following formula is particularly preferred as the radical $R^{14}$:

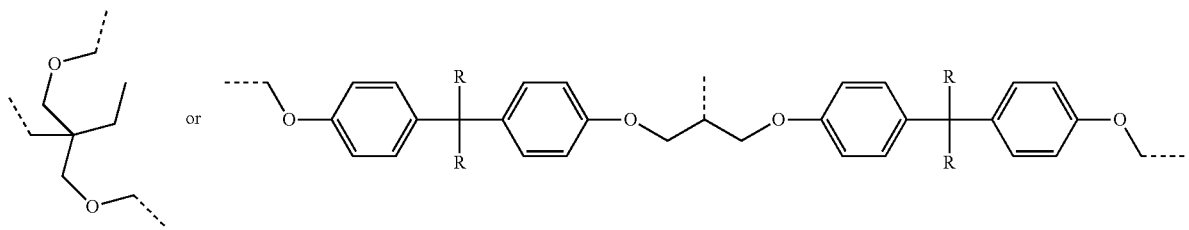

where R stands for methyl or H.

The free primary or secondary OH functional group of the monohydroxy) epoxy compound of formula (IVa) allows for efficient reaction with terminal isocyanate groups of polymers, without needing to use unusual excesses of the epoxide component.

The polyurethane polymer PU1 on which $Y^1$ is based can be synthesized from at least one diisocyanate or triisocyanate and at least one polymer $Q_{PM}$ having terminal amino, thiol, or hydroxyl groups and/or one optionally substituted polyphenol $Q_{PP}$.

Suitable diisocyanates are, for example, aliphatic, cycloaliphatic, aromatic, or araliphatic diisocyanates, in particular commercially available products such as methylene diphenyl diisocyanate (MDI), 1,4-butane diisocyanate, hexamethylene diisocyanate (HDI), toluene diisocyanate (TDI), tolidine diisocyanate (TODI), isophorone diisocyanate (IPDI), trimethyl hexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate ($H_{12}$MDI),p-phenylene diisocyanate (PPDI), or m-tetramethylxylylene diisocyanate (TMXDI) as well as dimers thereof. HDI, IPDI, MDI, or TDI are preferred.

Suitable triisocyanates are, for example, trimers or biurets of aliphatic, cycloaliphatic, aromatic, or araliphatic diisocyanates, in particular the isocyanurates and biurets of the diisocyanates described in the previous paragraph.

Of course, suitable mixtures of diisocyanates or triisocyanates can also be used.

Suitable polymers $Q_{PM}$ having terminal amino, thiol, or hydroxyl groups are in particular polymers $Q_{PM}$ having two or three terminal amino, thiol, or hydroxyl groups.

The polymers $Q_{PM}$ advantageously have a weight per equivalent of 300-6000, in particular 600-4000, preferably 700-2200 g/equivalent of NCO-reactive groups.

Suitable polymers $Q_{PM}$ are in particular polyoxyalkylene polyols, also called polyether polyols, hydroxy-terminated polybutadienepolyols, styrene/acrylonitrile grafted polyether polyols, polyhydroxy-terminated acrylonitrile/butadiene copolymers, polyester polyols, as well as polycarbonate polyols.

Particularly suitable as the polyphenol $Q_{PP}$ are bisphenols, trisphenols, and tetraphenols. This means not only pure phenols but optionally also substituted phenols. The nature of the substitution can be quite diverse. In particular, this means a direct substitution on the aromatic ring to which the phenol OH group is bonded. By phenols furthermore is meant not only mononuclear aromatics but also polynuclear or condensed aromatics or heteroaromatics having phenol OH groups directly on the aromatic or heteroaromatic rings.

Bisphenols and trisphenols are especially suitable. For example, suitable bisphenols or trisphenols are 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl)sulfone (=bisphenol S), naphthoresorcinol, dihydroxynaphthalene, dihydroxyanthraquinone, dihydroxybiphenyl, 3,3-bis(p-hydroxyphenyephthalide, 5,5-bis (4-hydroxyphenyl)hexahydro-4,7-methanoindane, phenolphthalein, fluorescein, 4,4'-[bis(hydroxyphenyl)-1,3-phenylenebis(1-methylethylidene)] (=bisphenol M), 4,4'-bis (hydroxyphenyl)-1,4-phenylenebis(1-methylethylidene)] (=bisphenol P), 2,2'-diallyl bisphenol A, diphenols and dicresols synthesized by reacting phenols or cresols with diisopropylidene benzene, phloroglucinol, gallic acid esters, phenol or cresol novolacs with number of OH functional groups ranging from 2.0 to 3.5, as well as all isomers of the aforementioned compounds.

Especially suitable tougheners D optionally present in the composition are tougheners which are amphiphilic hydroxyl group-containing block copolymers, such as are marketed under the trade name FORTEGRA®, in particular FORTEGRA®100, by Dow Chemical, or their reaction products with polyisocyanates and optionally other isocyanate-reactive compounds.

Especially suitable as the toughener D optionally present in the composition are any of those disclosed in the following articles or patents, whose contents are incorporated here by reference: EP 0 308 664 A1, in particular formula (I), especially page 5, Line 14 to page 13, Line 24; EP 0 338 985 A1, EP 0 353 190 A1, WO 00/20483 A1, in particular formula (I), especially page 8, Line 18 to page 12, Line 2; WO 01/94492 A1, in particular the reaction products denoted as D) and E), especially page 10, Line 15 to page 14, line 22; WO 03/078163 A1, in particular the acrylate-terminated polyurethane resin denoted as 13), especially page 14, Line 6 to page 14, Line 35; WO 2005/007766 A1, in particular formula (I) or (II), especially page 4, Line 5 to page 11 up to Line 20; EP 1 728 825 A1, in particular formula (I), especially page 3, line 21 to page 4 up to Line 47; WO 2006/052726 A1, in particular the amphiphilic block copolymer denoted as b), especially page 6, Line 17 to page 9, Line 10; WO 2006/052729 A1, in particular the amphiphilic block copolymer denoted as b), especially page 6, Line 25 to page 10, Line 2; T. J. Hermel-Davidock et al., *J. Polym. Sci. Part B: Polym. Phys.*, 45, 3338-3348 (2007), in particular the ambiphilic block copolymers, especially page 3339, 2nd column to page 3341, 2nd column; WO 2004/055092 A1, in particular formula (I), especially page 7, Line 28 to page 13 up to Line 15; WO 2005/007720 A1, in particular formula (I), especially page 8, Line 1 to page 17 up to Line 10; WO 2007/020266 A1, in particular formula (I), especially page 3, Line 1 to page 11 up to Line 6, as well as DE-A-2 123 033, US 2008/0076886 A1, WO 2008/016889, and WO 2007/025007.

It has been shown that advantageously more than one toughener is present in the composition, in particular also more than one toughener D.

The proportion of toughener D is advantageously used in an amount of 1-35 wt. %, in particular 1-25 wt. %, based on the weight of the composition.

In a further preferred embodiment, the composition in addition contains at least one filler F. Here the filler is preferably mica, talc, kaolin, wollastonite, feldspar, syenite, chlorite, bentonite, montmorillonite, calcium carbonate (precipitated or ground), dolomite, quartz, silicic acids (pyrogenic or precipitated), cristobalite, calcium oxide, aluminum hydroxide, magnesium oxide, hollow ceramic spheres, hollow glass spheres, hollow organic spheres, glass spheres, colored pigments. As the Filler F, we mean both organic coated and uncoated commercially available forms familiar to the person skilled in the art.

Another example is functionalized alumoxanes such as, for example, are described in U.S. Pat. No. 6,322,890.

The total proportion of total filler F is advantageously 3-50 wt. %, preferably 5-35 wt. %, in particular 5-25 wt. %, based on the weight of the total composition.

In embodiments, the composition may contain a physical or chemical blowing agent, as is available, for example, under the trade name EXPANCEL® from Akzo Nobel, or CELOGEN® from Chemtura, or under the trade name LUVOPOR® from Lehmann & Voss. The proportion of the blowing agent is advantageously 0.1-3 wt.-%, based on the weight of the composition.

In embodiments, the composition in addition may contain at least one epoxy group-containing reactive diluent G. These reactive diluents G are in particular:

Glycidyl ethers of monofunctional saturated or unsaturated, branched or unbranched, cyclic or open-chain $C_4$-$C_{30}$ alcohols, in particular selected from the group consisting of butyl glycidyl ether, hexyl glycidyl ether, 2-ethylhexyl glycidyl ether, allyl glycidyl ether, tetrahydrofurfuryl and furfuryl glycidyl ether, trimethoxysilylpropyl glycidyl ether (3-glycidyloxypropyltrimethoxysilane).

Glycidyl ethers of difunctional saturated or unsaturated, branched or unbranched, cyclic or open-chain $C_2$-$C_{30}$ alcohols, in particular selected from the group consisting of ethylene glycol glycidyl ether, butanediol glycidyl ether, hexanediol glycidyl ether, octanediol glycidyl ether, cyclohexane dimethanol diglycidyl ether, and neopentyl glycol diglycidyl ether.

Glycidyl ethers of trifunctional or polyfunctional, saturated or unsaturated, branched or unbranched, cyclic or open-chain alcohols such as epoxidized castor oil, epoxidized trimethylolpropane, epoxidized pentaerythrol, or polyglycidyl ethers of aliphatic polyols such as sorbitol, glycerol, or trimethylolpropane.

Glycidyl ethers of phenol compounds and aniline compounds, in particular selected from the group consisting of phenyl glycidyl ether, cresyl glycidyl ether, p-tert-butyl phenyl glycidyl ether, nonylphenyl glycidyl ether, 3-n-pentadecenyl glycidyl ether (from cashew nutshell oil), N,N-diglycidyl aniline, and p-aminophenyl triglycidyl [ether].

Epoxidized amines such as N,N-diglycidyl cyclohexylamine.

Epoxidized monocarboxylic acids or dicarboxylic acids, in particular selected from the group consisting of neodecanoic acid glycidyl ester, methacrylic acid glycidyl ester, benzoic acid glycidyl ester, phthalic acid diglycidyl ester, tetra- and hexahydrophthalic acid diglycidyl ester, and diglycidyl esters of dimeric fatty acids, as well as terephthalic acid glycidyl ester and trimellitic acid glycidyl ester.

Epoxidized difunctional or trifunctional, low molecular weight to high molecular weight polyether polyols, in particular polyethylene glycol diglycidyl ether or polypropylene glycol diglycidyl ether.

Hexanediol diglycidyl ether, cresyl glycidyl ether, p-tert-butylphenyl glycidyl ether, polypropylene glycol diglycidyl ether, and polyethylene glycol diglycidyl ether are especially preferred.

The total proportion of epoxy group-containing reactive diluent G is advantageously 0.1-20 wt. %, preferably 1-8 wt. %, based on the weight of the total composition.

The composition can include other components, in particular catalysts, stabilizers, in particular heat and/or light stabilizers, thixotropic agents, plasticizers, solvents, mineral or organic fillers, blowing agents, dyes and pigments, corrosion inhibitors, surfactants, defoamers, and adhesion promoters.

Suitable plasticizers are in particular phenyl alkylsulfonic acid esters or N-butyl benzenesulfonamide, such as are commercially available as MESAMOLL® or Dellatol BBS from Bayer.

Suitable stabilizers are in particular optionally substituted phenols such as BHT or WINGSTAY® T (Elikem), sterically hindered amines, or N-oxyl compounds such as TEMPO (Evonik)

It has been shown that the heat-curing epoxy resin compositions described are especially suitable as one-component adhesives. Such a one-component adhesive has broad applications. Here heat-curing one-component adhesives can be realized in particular that are distinguished by high impact strength both at elevated temperatures and especially at low temperatures, in particular between 0° C. and −40° C. Such adhesives are needed for bonding heat-stable materials. "Heat-stable materials" means materials which for a cure temperature of 100° C.-220° C., preferably 120° C.-200° C., are shape-stable at least during the cure time. Here the heat-stable materials in particular are metals and plastics such as ABS, polyamide, polyphenylene ethers, composite materials such as SMC, glass fiber reinforced unsaturated polyesters, epoxy or acrylate composites. A preferred use is when at least one material is a metal. A particularly preferred use is bonding of identical or different metals, in particular in bodyshells in the automobile industry. Preferred metals are especially steel, in particular electrogalvanized steel, hot-dip galvanized steel, lubricated steel, Bonazinc-coated steel, and subsequently phosphatized steel as well as aluminum, in particular the types commonly used in automobile construction.

Using an adhesive based on a heat-curing composition according to the invention, it is possible to achieve the desired combination of high crash resistance and both high and low operating temperature.

Such an adhesive in particular is first brought into contact with the materials to be bonded at a temperature between 10° C. and 80° C., in particular between 10° C. and 60° C., and is subsequently cured at a temperature of typically 100° C.-220° C., preferably 120°-200° C.

A further aspect of the present invention relates to a method for bonding heat-stable substrates, including the following steps:

i) Application of a heat-curing epoxy resin composition, as described in detail above, to the surface of a heat-stable substrate S1, in particular a metal;

ii) Bringing the applied heat-curing epoxy resin composition into contact with the surface of another heat-stable substrate S2, in particular a metal;

iii) Heating the composition to a temperature of 100° C.-220° C., in particular 140° C.-200° C., preferably between 160° C. and 190° C.

Substrate S2 here consists of material which is the same as or different from substrate S1.

Such a method for bonding heat-stable materials results in a bonded article. Such an article is preferably a vehicle or part of a vehicle.

Of course, in addition to heat-curing adhesives, sealants or coatings can also be realized with a composition according to the invention. Furthermore, the compositions according to the invention are not only suitable for automobile assembly but are also suitable for other areas of application. We should especially mention related applications in assembly of means of transportation such as ships, trucks, buses, or track vehicles, or in assembly of consumer goods such as, for example, washing machines.

The materials bonded by means of a composition according to the invention are used at temperatures between typically 120° C. and −40° C., preferably between 100° C. and −40° C., in particular between 80° C. and 40° C.

Such an adhesive in particular is first brought into contact with the materials to be bonded at a temperature between 10° C. and 80° C., in particular between 10° C. and 60° C., and is subsequently cured at a temperature of typically 100° C.-220° C., preferably 120°-200° C.

A further aspect of the present invention relates to a method for bonding heat-stable substrates, including the following steps:

i) Application of a heat-curing epoxy resin composition, as described in detail above, to the surface of a heat-stable substrate S1, in particular a metal;

ii) Bringing the applied heat-curing epoxy resin composition into contact with the surface of another heat-stable substrate S2, in particular a metal;

iii) Heating the composition to a temperature of 100° C.-220° C., in particular 140° C.-200° C., preferably between 160° C. and 190° C.

Substrate S2 here consists of material which is the same as or different from substrate S1.

Such a method for bonding heat-stable materials results in a bonded article. Such an article is preferably a vehicle or part of a vehicle.

Of course, in addition to heat-curing adhesives, sealants or coatings can also be realized with a composition according to the invention. Furthermore, the compositions according to the invention are not only suitable for automobile assembly but are also suitable for other areas of application. We should especially mention related applications in assembly of means of transportation such as ships, trucks, buses, or track vehicles, or in assembly of consumer goods such as, for example, washing machines.

The materials bonded by means of a composition according to the invention are used at temperatures between typically 120° C. and 40° C., preferably between 100° C. and −40° C., in particular between 80° C. and −40° C.

An especially preferred use of the heat-curing epoxy resin composition according to the invention is its use as a heat-curing one-component bodyshell adhesive in vehicle assembly or as stiffening material or as a foamable heat-curing composition for reinforcement in cavities of structural components and reinforcement elements.

EXAMPLES

Preparation of Activators

General instructions for C-1 and C-3 (having 1 imidazoline structure)

Dissolve 0.5 mol of the amine in ethylene glycol. Then add 0.33 mol of the respective ester at 130° C. After the reaction is complete, add another 0.17 mol of the ester and stir for 4 hours at 130° C. Continue stirring for 2 hours at 170° C. and then drive off the solvent ethylene glycol under vacuum, until the activator crystallizes out. In some cases, this does not happen. If so, pour the solution on crushed ice, and the activator precipitates as a powder.

General instructions for C-2 and C-Ref (having 2 imidazoline structures)

Slowly add 0.25 mol of the amine dropwise into 0.75 mol of the ester (dissolved in ethylene glycol). Heat the mixture and stir for 4 hours at 130° C. Drive off [the solvent] and isolate as already described above for the mole ratio 1:1; during distillation, the excess ester is also removed.

TABLE 1

Activators. The numbers represent the mole ratio of the amine or ester.

|  | C-1 | C-2 | C-3 | C-Ref. |
|---|---|---|---|---|
| N-(2-Hydroxyethyl)ethylenediamine | 1 |  |  |  |
| Diethylenetriamine (DETA) |  | 1 |  | 1 |
| N-Isopropylaminoethylamine |  |  | 1 |  |
| 2,4-Dihydroxybenzoic acid methyl ester | 1 |  |  |  |
| Methyl 5-methylsalicylate |  | 3 |  |  |
| Methyl 5-chlorosalicylate |  |  | 1 |  |
| Methyl salicylate |  |  |  | 3 |

Preparation of Epoxy Resin Compositions

For preparation of epoxy resin compositions 1 to 6 and the Reference Examples Ref. 1 and Ref. 2, the respective activator was stirred into a mixture of ARALDITE® GY 250 (Huntsman) ("BADGE") and DYHARD® 100SF (dicyanodiamide) (Alzchem) ("dicy"). Table 2 gives the amounts in parts by weight.

DSC was run for each epoxy resin composition mixed in this way, on a Mettler DSC $822^E$ (heating from 25° C. to 250° C., with heating rate of 10° K/minute). First the maximum of the reaction peak was determined as $T_{max}$ from the measured curve, as well as the onset $T_{onset}$ calculated from the curve.

TABLE 2

Formulations of the compositions and their properties.

|  | 1 | 2 | 3 | Ref. 1 | 4 | 5 | 6 | Ref. 2 |
|---|---|---|---|---|---|---|---|---|
| BADGE | 93.2 | 93.2 | 93.2 | 93.2 | 93.2 | 93.2 | 93.2 | 93.2 |
| dicy | 6.8 | 6.8 | 6.8 | 6.8 | 6.8 | 6.8 | 6.8 | 6.8 |
| C-1 | 1.0 |  |  |  | 2.0 |  |  |  |
| C-2 |  | 1.0 |  |  |  | 2.0 |  |  |
| C-3 |  |  | 1.0 |  |  |  | 2.0 |  |
| C-Ref. |  |  |  | 1.0 |  |  |  | 2.0 |
| $T_{onset}$ [° C.] | 153 | ND* | ND* | 168 | 149 | 138 | 135 | 167 |
| $T_{max}$ [° C.] | 174 | ND* | ND* | 178 | 166 | 150 | 150 | 177 |

*ND = not determined.

What is claimed is:

1. A heat-curing epoxy resin composition, comprising:
an epoxy resin A having more than one epoxy group per molecule on average;
a curing agent B for epoxy resins, the curing agent B being activated at a temperature in a range of 100° C. to 220° C.; and
an activator C for epoxy resin compositions, wherein activator C is a compound of formula (I), or is a reaction product between a compound of formula (Ia) and an isocyanate or an epoxide;

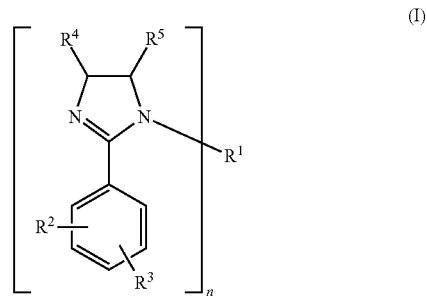

(I)

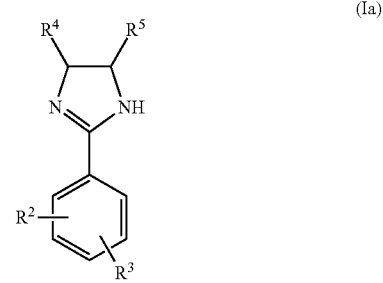

(Ia)

where:
n is 1, 2, 3, or 4;
$R^1$ is an n-valent, optionally hetero atom-containing aliphatic, cycloaliphatic, or aromatic organic radical, or else $R^1$ is a radical of formula (II):

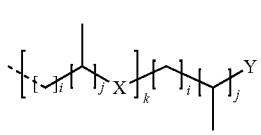

(II)

where:

i, j, and k are each independently a number from 0 to 10, provided that the sum of i and j is at least 2;

X is O, S, or NR$^7$;

Y is OR$^7$, SR$^7$, or N(R$^7$)(R$^{7'}$) or a substituent of formula (III):

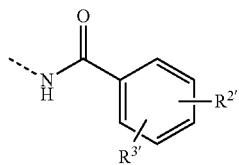

(III)

where:

R$^{2'}$ and R$^{3'}$ each independently stands for H, OH, a halogen, NH$_2$, NHR$^7$, N(R$^7$)$_2$, an alkoxy group, an alkyl group, an aryl group, an alkylaryl group, or an arylalkyl group, or R$^{2'}$ together with R$^{3'}$ is an optionally substituted aliphatic or aromatic ring;

R$^7$ and R$^{7'}$ each independently stands for H, or an alkyl, cycloalkyl, aralkyl, or aryl group with 1 to 8 carbon atoms;

R$^2$ and R$^3$ each independently stands for OH, a halogen, NH$_2$, NHR$^7$, N(R$^7$)$_2$, an alkoxy group, an alkyl group, an aryl group, an alkylaryl group, or an arylalkyl group, or R$^2$ together with R$^3$ is a substituted or unsubstituted aliphatic or aromatic ring;

R$^4$ and R$^5$ each independently stands for H, OH, or R$^4$ together with R$^5$ is a substituted or unsubstituted aliphatic or aromatic ring;

at least one of R$^2$, R$^3$, R$^4$, and R$^5$ is different from H; and if R$^{2'}$ and/or R$^{3'}$ are present, at least three of R$^2$, R$^{2'}$, R$^3$, and R$^{3'}$ are different from H.

2. The composition of claim 1, wherein the activator C is a compound of formula (I-1) or (I-2):

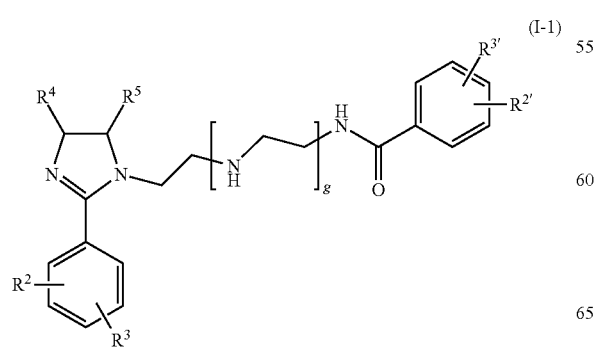

(I-1)

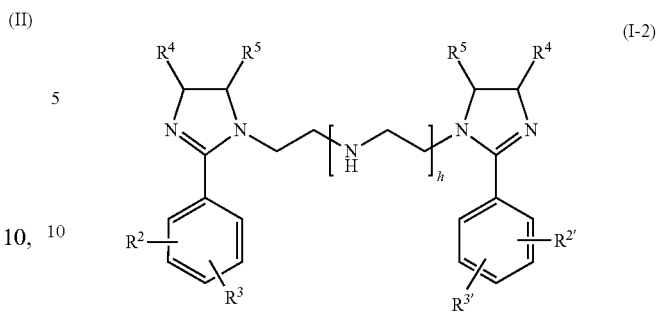

(I-2)

where:

g is 0, 1, 2, or 3; and h is 0, 1, or 2.

3. The composition of claim 2, wherein:

R$^2$ and R$^{2'}$ are each OH; and

R$^3$ and R$^{3'}$ each independently stands for OH, Cl, CH$_3$, or OCH$_3$.

4. The composition of claim 1, wherein:

the activator C is a reaction product between a compound of formula (Ia) and an isocyanate, and contains a structural element of formula (Ia-1):

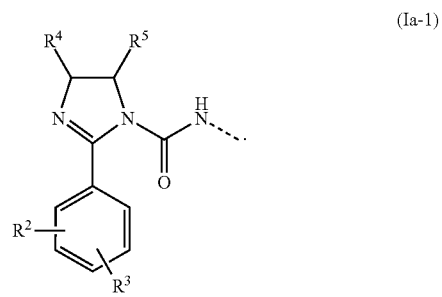

(Ia-1)

5. The composition of claim 4, wherein the isocyanate is selected from the group consisting of phenyl isocyanate, tolyl isocyanate, hexamethylene diisocyanate (HDI), isophorone diisocyanate (IPDI), methylene diphenyl diisocyanate (MDI), and toluene diisocyanate (TDI).

6. The composition of claim 1, wherein the activator C is a reaction product between a compound of formula (Ia) and an epoxide, and has at least one structural element of formula (Ia-2) or (Ia-2'):

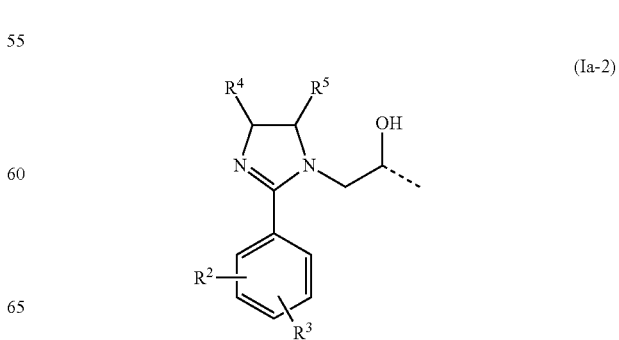

(Ia-2)

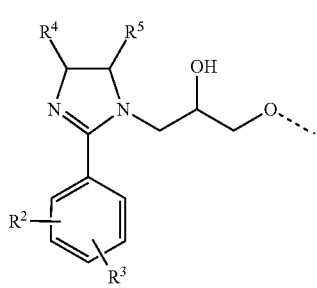
(Ia-2')

7. The composition of claim 1, wherein the activator C does not have any primary or secondary amino groups.

8. The composition of claim 1, further comprising a toughener D.

9. The composition of claim 8, wherein the toughener D is selected from the group consisting of blocked polyurethane polymers, liquid rubbers, epoxy resin-modified liquid rubbers, and core/shell polymers.

10. The composition of claim 9, wherein the toughener D is a liquid rubber which is an acrylonitrile/butadiene copolymer, which is terminated by carboxyl groups or (meth)acrylate groups or epoxy groups, or is a derivative thereof.

11. The composition of claim 8, wherein the toughener D is a blocked polyurethane polymer of formula (IV):

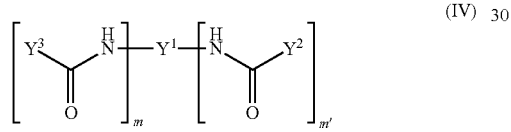
(IV)

where:
- $Y^1$ is a linear or branched polyurethane polymer PU1 terminated by m+m' isocyanate groups, after removal of all terminal isocyanate groups;
- $Y^2$ each independently stands for a blocking group that is cleaved at a temperature above 100° C.;
- $Y^3$ each independently stands for a group of formula (IV'):

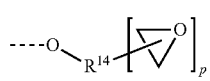
(IV')

where:
- $R^{14}$ stands for an aliphatic, cycloaliphatic, aromatic, or araliphatic epoxy radical containing a primary or secondary hydroxyl group, after removal of the hydroxy and epoxy groups;
- p is 1, 2, or 3; and
- m and m' each independently stands for a number from 0 and 8, provided that m+m' stands for a number from 2 to 8.

12. The composition of claim 11, wherein $Y^2$ stands for a radical selected from the group consisting of:

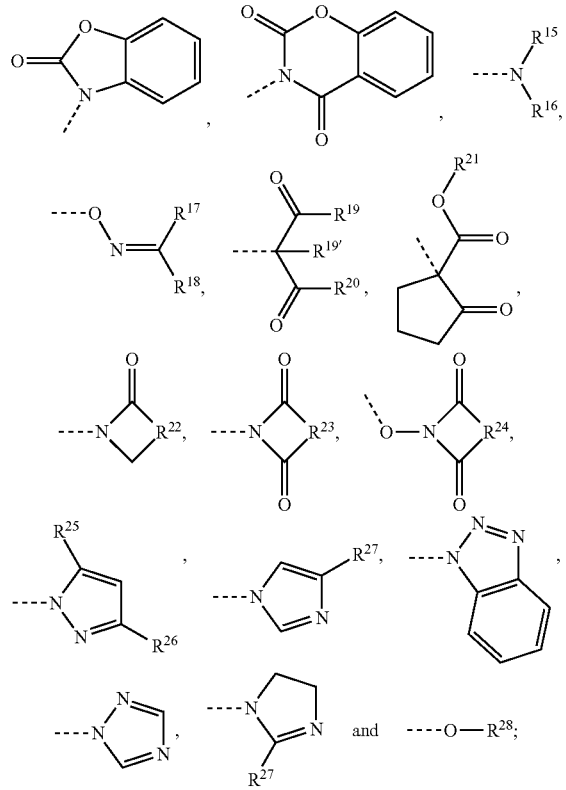

where:
- $R^{15}$, $R^{16}$, $R^{17}$ and $R^{18}$ each independently stands for an alkyl, cycloalkyl, aryl, aralkyl, or arylalkyl group, or $R^{15}$ together with $R^{16}$, or $R^{17}$ together with $R^{18}$, form part of a 4- to 7-membered ring, which is optionally substituted;
- $R^{19}$, $R^{19'}$, and $R^{20}$ each independently stands for an alkyl, aralkyl, aryl, arylalkyl, alkyloxy, aryloxy, or aralkyloxy group;
- $R^{21}$ stands for an alkyl group;
- $R^{22}$, $R^{23}$, and $R^{24}$ each independently stands for an alkylene group with 2 to 5 C atoms, which optionally has double bonds or is optionally substituted, or for a phenylene group or for a hydrogenated phenylene group;
- $R^{25}$, $R^{26}$, and $R^{27}$ each independently stands for H, an alkyl group, an aryl group, or an aralkyl group; and
- $R^{28}$ stands for an aralkyl group, or a mononuclear or polynuclear substituted or unsubstituted aromatic group, wherein $R^{28}$ optionally has aromatic hydroxyl groups.

13. The composition of claim 11, wherein m is different from 0.

* * * * *